United States Patent
Anderson

[11] Patent Number: 5,805,411
[45] Date of Patent: Sep. 8, 1998

[54] SUPPORT FOR CAPACITOR

[75] Inventor: W. Kyle Anderson, Rockford, Ill.

[73] Assignee: Sundstrand Corporation, Rockford, Ill.

[21] Appl. No.: 105,699

[22] Filed: Aug. 11, 1993

[51] Int. Cl.⁶ .................................................. H01G 4/228
[52] U.S. Cl. ....................... 361/306.1; 361/811
[58] Field of Search ................... 361/301.2, 302, 361/306.1, 306.2, 308.1, 308.2, 308.3, 328, 329, 330, 784, 790, 773, 807, 809, 785; 439/842, 843, 844, 851, 82, 876; 174/263, 266; 338/315, 318

[56] References Cited

U.S. PATENT DOCUMENTS

| | | | |
|---|---|---|---|
| 1,990,819 | 2/1935 | Danziger | 361/308.3 |
| 2,907,976 | 10/1959 | Damon | 439/844 |
| 3,177,405 | 4/1965 | Gray | 361/329 |
| 3,685,002 | 8/1972 | Kennedy | 361/769 |
| 4,128,293 | 12/1978 | Paoli | 439/844 |
| 4,982,376 | 1/1991 | Megens | 174/263 |
| 5,083,927 | 1/1992 | Herard | 439/851 |

FOREIGN PATENT DOCUMENTS

0057612  3/1989  Japan .................................. 361/329

*Primary Examiner*—Bot L. Ledynh
*Attorney, Agent, or Firm*—Marshall, O'Toole, Murray, Gerstein & Borun

[57] ABSTRACT

A capacitor has first and second pin contacts. A first female contact receives the first pin contact of the capacitor, and a second female contact receives the second pin contact of the capacitor. Electrical contact is established between the first and second pin contacts and the corresponding first and second female contacts. The first and second female contacts are in corresponding first and second displaced planes.

36 Claims, 5 Drawing Sheets

SUPPORT FOR CAPACITOR

TECHNICAL FIELD OF THE INVENTION

The present invention relates to an arrangement for the support and electrical connection of capacitors, and more particularly to an arrangement for the support and electrical connection of capacitors which have pin type contacts.

BACKGROUND OF THE INVENTION

Capacitors are commonly used in a variety of electrical applications. For example, capacitors are used to tune the frequency of radio and television receivers, to eliminate sparking in automobile ignition systems, as energy storing devices, in electronic flashing units, and as filters in power supplies such as variable speed, constant frequency power generation systems used for providing three phase electrical power. In a variable speed, constant frequency power generation system, a variable speed mechanical input, such as the engine of an aircraft, mechanically drives a generator at a variable speed. Because the generator is being driven at a variable speed, the frequency of its output signal is consequently variable. A variable speed, constant frequency power generation system converts the variable frequency output from a variable speed, mechanically driven generator into constant frequency alternating current for use by alternating current loads.

In a typical variable speed, constant frequency power generation system, a rectifier converts the variable frequency output from a variable speed, mechanically driven generator into a DC signal. An inverter then inverts the DC signal from the rectifier into constant frequency AC output power. Capacitors are typically used both at the output of the rectifier for smoothing the DC signal provided by the rectifier and at the output of the inverter for eliminating unwanted harmonics of the inverter fundamental frequency from the constant frequency AC output power.

Capacitors generally consist of two or more electrodes separated by a dielectric. The amount of capacitance of a capacitor is dependent upon the surface area of the electrodes of the capacitor, the distance separating the electrodes, and the permittivity of the dielectric separating the electrodes.

A capacitor can have a variety of geometric constructions. A parallel plate capacitor, for example, is a capacitor in which the electrodes thereof are parallel plates separated by a dielectric having both a thickness and a permittivity selected to control the amount of capacitance of the capacitor.

A cylindrical capacitor is a capacitor in which one of its electrodes is a first cylindrical hollow tube and another of its electrodes is a second cylindrical hollow tube concentric with the first cylindrical hollow tube. A dielectric between the first and second cylindrical hollow tubes has a thickness and a permittivity selected to control the capacitance of the cylindrical capacitor.

A spherical capacitor has one electrode in the form of a hollow sphere surrounding another electrode in the form of a usually solid concentric sphere. The volume between the hollow sphere and the concentric sphere contains a dielectric having a thickness and a permittivity selected to control the capacitance of the spherical capacitor.

A cylindrical film capacitor consists of a sandwich construction typically having four strips. These four strips are, in order, a first conducting strip, a first dielectric strip, a second conducting strip separated from the first conducting strip by the first dielectric strip, and a second dielectric strip. The four strips are wound such that, if the wound capacitor is viewed on end, the layers of the capacitor have a spiral appearance. In the resulting capacitor, the first and second dielectric strips electrically insulate the first and second conducting strips from one another.

Various arrangements for electrically connecting and mechanically supporting a capacitor have been provided in the prior art. One common arrangement for electrically connecting and mechanically supporting a capacitor, such as a multilayer capacitor, is a printed circuit board which has receptacles for receiving pins of the capacitor. The pins are inserted through holes in the printed circuit board and are then soldered to appropriate conductive circuit paths of the printed circuit board. Thus, the solder used in soldering the capacitor to these circuit paths not only electrically connects the capacitor to the printed circuit board but also facilitates the mechanical support of the capacitor by the printed circuit board. For a large capacitor, however, the stress on the pins which support the capacitor to the printed circuit board can exceed design limits; in fact, this stress can be so large that the pins of the capacitor cannot effectively support the capacitor.

Another common arrangement for electrically connecting and mechanically supporting a capacitor, particularly a large multilayer capacitor such as a film capacitor which is used in variable speed, constant frequency power generation systems, is to provide the connector ends of the capacitor with corresponding tapped holes surrounded by wrenching flats. The capacitor is then electrically connected to bus bars by employing the wrenching flats of the connector ends of the capacitor in order to thread screws, which project through the bus bars, into the tapped holes of the capacitor connector ends. This electrical connection and mechanical support arrangement, however, is vulnerable to damage by foreign objects, and a capacitor failure can bend and distort the bus bar and the mechanical clamping hardware. Also, this arrangement requires multiple fasteners any of which can loosen and cause electrical failure.

Furthermore, all of the arrangements described above for electrically connecting and mechanically supporting a capacitor involve labor intensive procedures and are costly to implement. The present invention reduces the labor and cost, and eliminates many of the problems, associated with electrically connecting and mechanically supporting a capacitor.

SUMMARY OF THE INVENTION

Accordingly, in one aspect of the invention, a capacitor has first and second pin contacts. An arrangement for the support and electrical connection of the capacitor includes a first pin receiving means for receiving the first pin contact of the capacitor and for establishing an electrical connection between the first pin contact and the first pin receiving means. The arrangement also includes a second pin receiving means for receiving the second pin contact of the capacitor and for establishing an electrical connection between the second pin contact and the second pin receiving means. The first and second pin receiving means are in corresponding first and second planes which are displaced with respect to one another.

In another aspect of the invention, a support includes first and second female electrical contacts. A capacitor includes first and second ends. An electrode region of the capacitor has an axis which intersects the first and second ends. An elongated and substantially straight first male electrical contact of the capacitor is at, and substantially perpendicular to, the first end of the capacitor, and an elongated and substantially straight second male electrical contact of the capacitor is at, and substantially perpendicular to, the second end of the capacitor. The first male electrical contact is inserted into the first female electrical contact of the support to establish an electrical connection to the first female electrical contact. The second male electrical contact is inserted into the second female electrical contact to establish an electrical connection to the second female electrical contact.

In yet another aspect of the invention, a capacitor includes first and second ends. An electrode region of the capacitor is linearly arranged between the first and second ends. The electrode region has a longitudinal axis extending through the first and second ends of the capacitor. The capacitor further includes a first electrical pin contact at the first end of the capacitor. The first electrical pin contact has first and second ends, and the first electrical pin contact has a longitudinal axis extending through its first and second ends. The longitudinal axis of the first electrical pin contact is parallel to the longitudinal axis of the electrode region. The capacitor further includes a second electrical pin contact at the second end of the capacitor. The second electrical pin contact has first and second ends, and the second electrical pin contact has a longitudinal axis extending through its first and second ends. The longitudinal axis of the second electrical pin contact is parallel to the longitudinal axis of the electrode region.

BRIEF DESCRIPTION OF THE DRAWING

These and other features and advantages will become more apparent from a detailed consideration of the invention when taken in conjunction with the drawing in which.

DETAILED DESCRIPTION

Figures 1, 2, 4, 5:
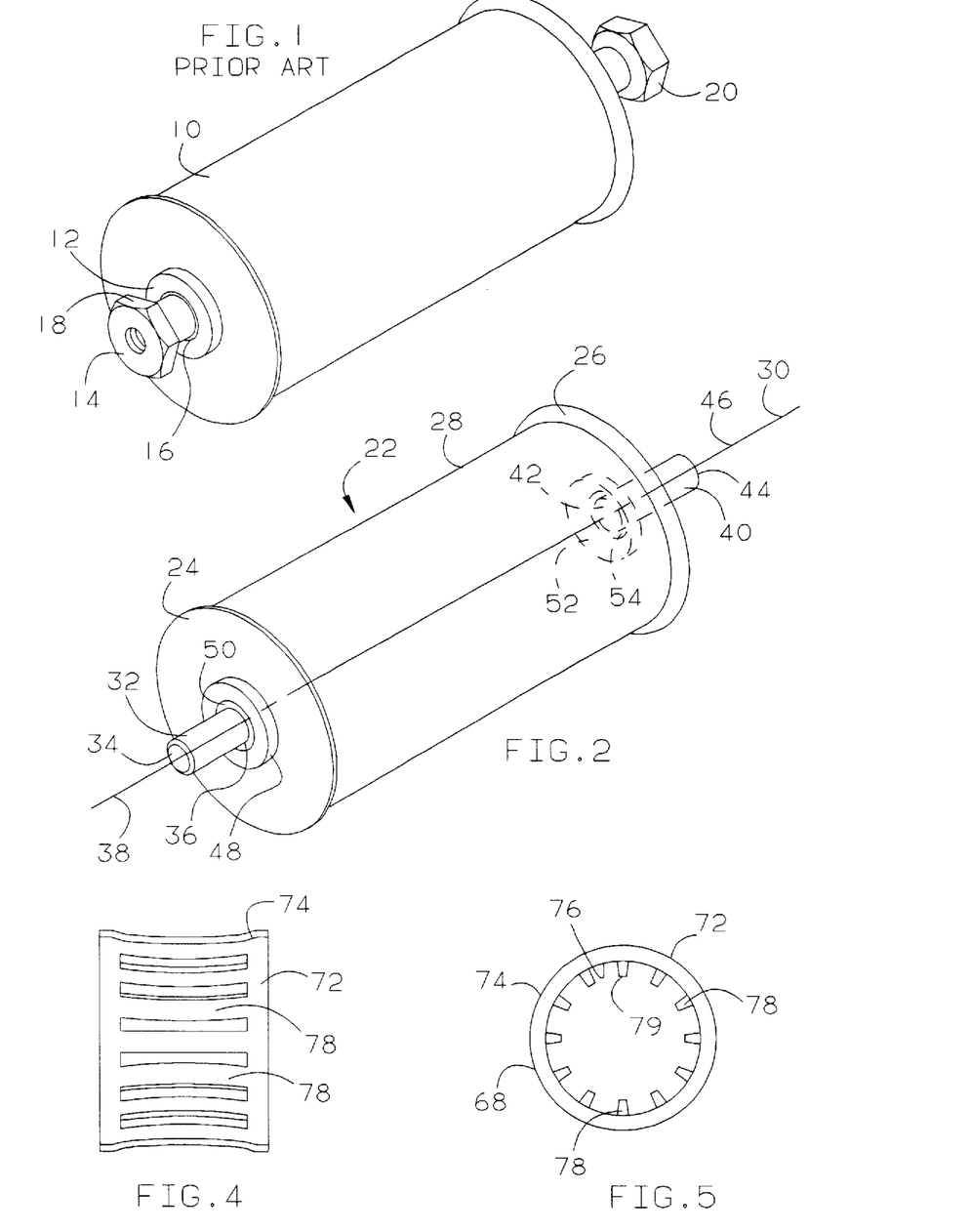
FIG. 1 illustrates a capacitor with prior art tapped connectors for facilitating the electrical connection of the capacitor.
FIG. 2 illustrates a capacitor according to the present invention.
FIGS. 4 and 5 illustrate in greater detail a female contact insert for the electrical connection arrangement shown in FIG. 3.

As shown in FIG. 1, a capacitor 10 includes at one end thereof a pilot 12, a connector 14 having a tapped hole, glass insulation 16, and wrenching flats 18 on the connector 14. The pilot 12 is a positioning pilot and may cooperate with a corresponding hole in a pilot plate to assist in correctly positioning the capacitor 10. A threaded screw (not shown) is typically inserted through a first bus bar or conductor, and a wrench is applied to the wrenching flats 18 in order to thread the threaded screw into the tapped hole of the connector 14. Once the screw is threaded into the connector 14 of the capacitor 10, an electrical connection is established between a corresponding electrode of the capacitor 10 and the first bus bar or conductor. The glass insulation 16 electrically insulates the connector 14 from the pilot 12 and the casing of the capacitor 10. The other end of the capacitor 10, which may be similarly configured with a pilot (not shown), a connector 20 having a tapped hole (not shown), and wrenching flats on the connector 20, is similarly electrically connected to a second bus bar or conductor. These first and second bus bars or conductors are typically operated at different potentials.

As discussed above, the procedure of using the wrenching flats on the connectors 14 and 20 and screws to electrically connect the capacitor 10 to bus bars or conductors is labor intensive, and increases the cost of manufacturing and assembling devices using capacitors such as the capacitor 10 shown in FIG. 1. Also, the threaded screws can loosen thereby breaking the electrical connection between the capacitor 10 and its corresponding bus bars or conductors. Furthermore, a failure of the capacitor 10 may result in axial movement of the tapped connectors 14 and 20 thereby bending and distorting the bus bars to which the tapped connectors 14 and 20 are electrically connected. In order to reduce the manufacturing and assembly costs associated with the electrical support of capacitors, to reduce the likelihood that electrical connections will be interrupted, and to prevent distortion and bending of bus bars due to failed capacitors, the present invention includes a capacitor 22 shown in FIG. 2.

As shown in FIG. 2, the capacitor 22 includes a first end 24 and a second end 26. An electrode region 28 of the capacitor 22 extends between the first end 24 and the second end 26. The electrode region 28 contains at least first and second electrodes of the capacitor 22 and has a longitudinal axis 30 which extends through, and intersects, the first end 24 and the second end 26.

A first pin type male contact 32 has a first end 34, a second end 36, and an axis 38 which extends through, and intersects, the first end 34 and the second end 36 of the first pin type male contact 32. The axis 38 is coextensive with, and therefore parallel to, the longitudinal axis 30 of the electrode region 28. A second pin type male contact 40 has a first end 42, a second end 44, and a longitudinal axis 46 which extends through, and intersects, the first end 42 and the second end 44 of the second pin type male contact 40. The axis 46 is coextensive with, and therefore parallel to, the longitudinal axis 30 of the electrode region 28. The axes 38 and 46 of the corresponding pin type male contacts 32 and 40 need not be coextensive with the longitudinal axis 30 of the electrode region 28 but may be offset therefrom and parallel thereto.

The end 36 of the first pin type male contact 32 is electrically connected to a first electrode in the electrode region 28 of the capacitor 22. The end 42 of the second pin type male contact 40 is electrically connected to a second electrode in the electrode region 28 of the capacitor 22. The first end 24 of the capacitor 22 has a pilot 48, and the first pin type male contact 32 extends through the pilot 48 into the electrode region 28. An insulating material 50, such as glass, electrically insulates the first pin type male contact 32 from the pilot 48 and the casing of the capacitor 22. The second end 26 of the capacitor 22 may also have a pilot 52 and an electrically insulating material 54.

The electrodes within the electrode region 28 of the capacitor 22 may have any of a variety of configurations. For example, these electrodes may be alternating layers of dielectric and conductive materials wound into the spiral configuration of a film type capacitor, or they may be plate electrodes of a parallel plate capacitor.

Figure 3:
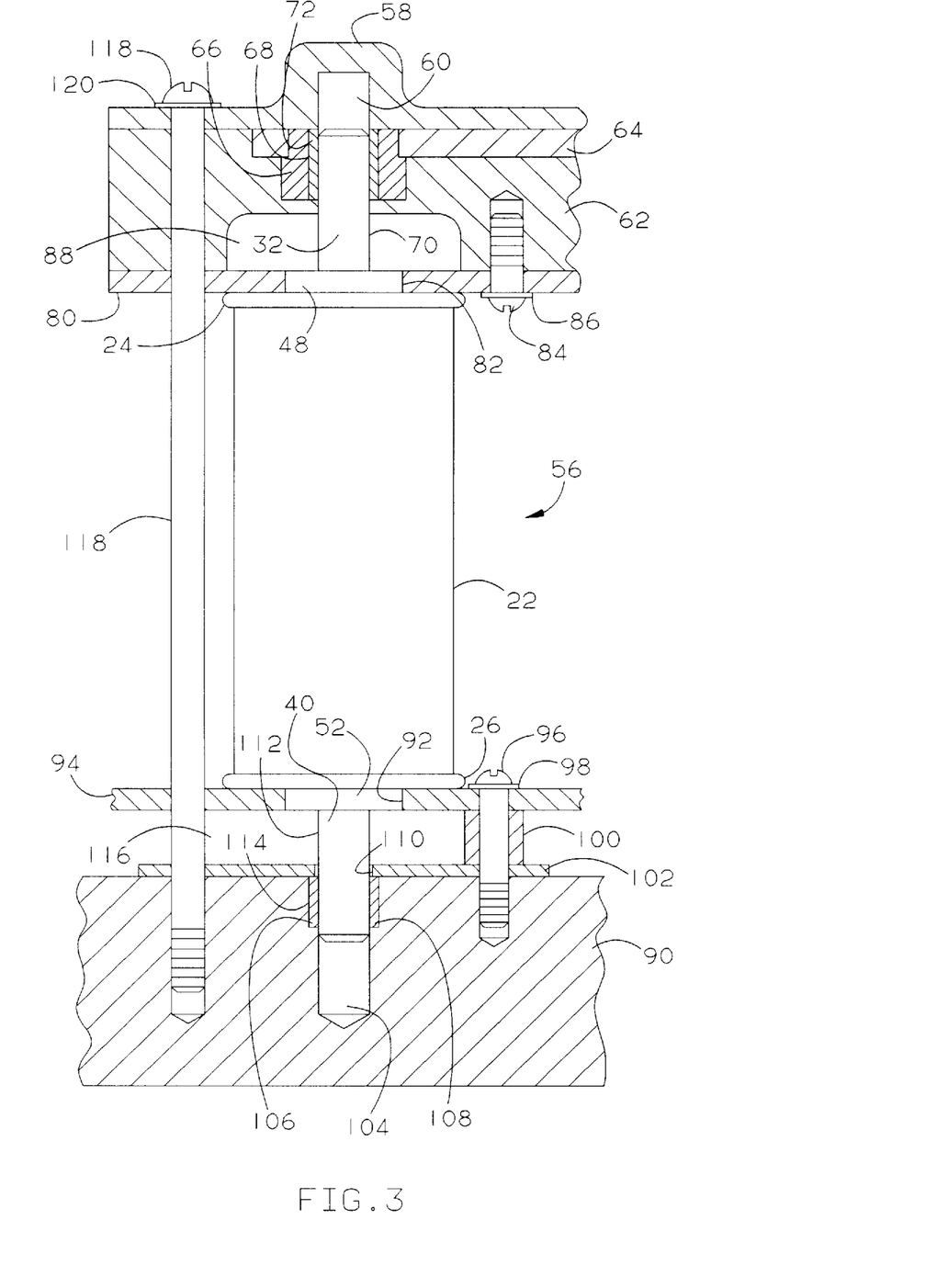
FIG. 3 illustrates an arrangement for mechanically supporting and electrically connecting the capacitor shown in FIG. 2.

FIG. 3 shows an arrangement 56 for electrical connecting and mechanically supporting the capacitor 22. The electrical connection and mechanical support arrangement 56 includes an electrically insulating material 58 having a void 60 in the form of a recess. The electrical connection and mechanical support arrangement 56 also includes an electrically insulating material 62 and a conductor 64 between the insulating material 58 and the insulating material 62. The conductor 64 may be in the form of a bus bar or a conductor plate and has a female contact 66 electrically attached thereto through a suitable hole in the conductor 64. The female contact 66 may be an electrically conductive bushing or boss, for example, and may be electrically attached to the conductor 64 as by braising or by any other suitable means. The female contact 66 has an inner perimeter 68 which is larger than an outer perimeter 70 of the first pin type male contact 32.

Within the female contact 66 is a female contact insert 72 which is shown in more detail in FIGS. 4 and 5. The female contact insert 72 has an outer perimeter 74 which is arranged to substantially match the inner perimeter 68 of the female contact 66. The female contact insert 72 has an inner perimeter 76 having a geometric shape arranged to substantially match the geometric shape of the outer perimeter 70 of the pin type male contact 32. Since the pin type male contact 32 is preferably cylindrical, the inner perimeter 76 of the female contact insert 72 is, therefore, preferably cylindrical.

The female contact insert 72 has a plurality of louvers 78 forming a plurality of contact lines (or points) having an inner perimeter 79 which is somewhat smaller than the inner perimeter 76. These plurality of louvers 78 flex as the pin type male contact 32 is inserted into the female contact insert 72 within the female contact 66 in order to accommodate variations in the tolerances between the female contact 66 and the pin type male contact 32. Accordingly, the female contact insert 72 insures a good electrical contact between the pin type male contact 32 and the conductor 64.

A pilot plate 80 of the electrical connection and mechanical support arrangement 56 has a pilot hole 82 therein for accommodating the pilot 48 of the capacitor 22. The pilot plate 80 with its pilot hole 82 together with the pilot 48 of the capacitor 22 are arranged as locators in order to establish alignment of the capacitor 22 as the pin type male contact 32 is inserted into the female contact 66 and to maintain that alignment once the pin type male contact 32 is fully inserted into the female contact 66. The pilot plate 80 is fastened to the insulating material 62 by way of a screw 84 and a washer 86. A void 88, in the form of a recess, is provided in the insulating material 62.

The other end 26 of the capacitor 22 is supported by a chassis or housing 90. The housing 90 may be electrically conducting and may be maintained at a reference potential such as ground. The pilot 52 at the end 26 of the capacitor 22 cooperates with a pilot hole 92 in a pilot plate 94 in order to establish and maintain alignment of the capacitor 22 with respect to the housing 90. The pilot plate 94 is mounted to the housing 90 by way of a screw 96, a washer 98, a spacer 100, and a contact retainer plate 102. The screw 96 is inserted through the washer 98, through the pilot plate 94, through the spacer 100, through the contact retainer plate 102, and is threaded into the housing 90.

The housing 90 has a void 104, in the form of a recess, and a void 106, also in the form of a recess. The void 106 is concentric with the void 104. The void 106 has a larger internal perimeter than does the void 104 and forms a female contact to electrically receive the pin type male contact 40 of the capacitor 22. Within the void 106 is a female contact insert 108 of similar construction to the female contact insert 72. The female contact insert 108 has an outer perimeter substantially commensurate with the internal perimeter of the female contact void 106 and a plurality of louvers arranged around an inner perimeter thereof to ensure good electrical contact between the second pin type male contact 40 of the capacitor 22 and the housing 90.

The contact retainer plate 102 has a hole 110 which is somewhat larger than an outer perimeter 112 of the pin type male contact 40 of the capacitor 22 but smaller than an outer perimeter 114 of the female contact insert 108. Accordingly, the female contact insert 108 is retained within the female contact void 106 by the contact retainer plate 102. A void 116 is thus provided between the pilot plate 94 and the contact retainer plate 102.

A clamping screw 118 is inserted through a washer 120, through the insulating material 58, through the insulating material 62, through the pilot plate 80, through the pilot plate 94, through the contact retainer plate 102, and is threaded into the housing 90. When tightened into the housing 90, the clamping screw 118 exerts a clamping force through the washer 120, the insulating material 58, the insulating material 62, the pilot plate 80, the capacitor 22, the pilot plate 94, the spacer 100, and the contact retainer plate 102 to clamp the capacitor 22 in electrical engagement between the conductor 64 and the housing 90. As can be seen, this arrangement mechanically supports the capacitor 22. The clamping screw 118 is electrically insulated from the conductor 64 by the insulating material 58 and by the insulating material 62.

Accordingly, instead of attaching a bus bar or other conductor to a capacitor by threading screws into the tapped holes of the capacitor's connectors, the first and second pin type male contacts 32 and 40 of the capacitor 22 are merely inserted into their corresponding female contact 66 and female contact void 106.

The voids 88 and 116 and the voids 60 and 104 accommodate a failure of the capacitor 22. For example, when a film capacitor fails, it tends to expand axially. If the axial movement along the longitudinal axis 30 of the capacitor 22 is not absorbed, the capacitor 22 may instead explode radially. Radial explosion may be severe and could cause a great deal of damage to adjacent hardware. Accordingly, upon failure and resulting axial expansion of the capacitor 22, the void 88 allows the pilot plate 80 to bend into the void 88, and the void 116 allows the pilot plate 94 to bend into the void 116 in order to permit axial expansion of the failed capacitor 22. Also, the voids 60 and 104 allow the corresponding contacts 32 and 40 to slide therein; accordingly, bending and distortion of the bus bar 64 is prevented. Therefore, the likelihood of a radial explosion of the capacitor 22 is reduced.

Figure 6:
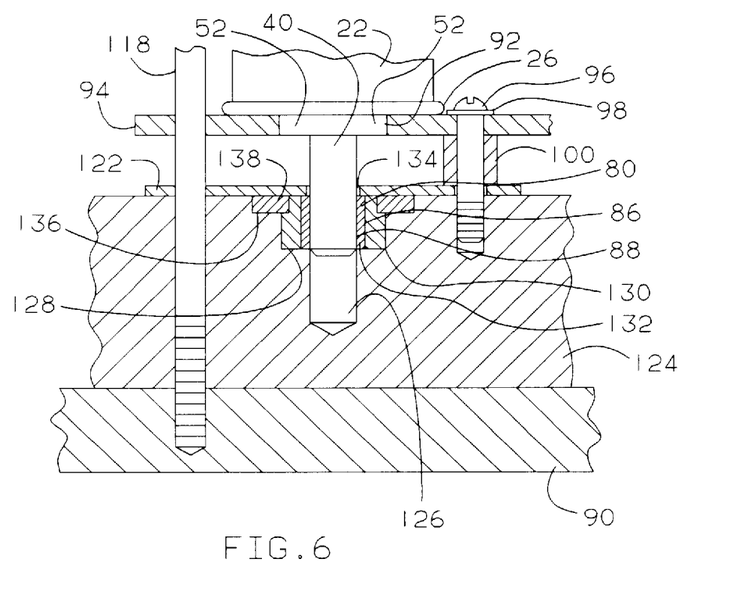
FIG. 6 illustrates an alternative arrangement for mechanically supporting and electrically connecting the capacitor shown in FIG. 2.

Instead of electrically connecting and mechanically supporting the end 26 of the capacitor 22 as shown in FIG. 3, the arrangement shown in FIG. 6 may be used. In FIGS. 3 and 6, like reference numerals depict like parts. In the arrangement of FIG. 6, the housing 90 is electrically insulated from the pin type male contact 40 of the capacitor 22. The pilot 52 at the end 26 of the capacitor 22 cooperates with the pilot hole 92 in the pilot plate 94 in order to establish alignment of the capacitor 22 as the pin type male contact 40 is inserted into its corresponding female contact and to maintain that alignment once the pin type male contact 40 is fully inserted into its female contact.

The pilot plate 94 is mounted to the housing 90 by way of the screw 96 and the washer 98. The screw 96 is inserted through the washer 98, through the pilot plate 94, through the spacer 100, through a contact retainer plate 122, and is threaded into an electrically insulating material 124. The insulating material 124 has a void 126, in the form of a recess, and a void 128, also in the form of a recess. The void 128 is concentric with the void 126. The void 128 has a larger internal perimeter than does the void 126. Within the void 128 is a female contact 130 which may be, for example, a female boss.

Within the female contact 130 is a female contact insert 132 of similar construction to the female contact insert 72. The female contact insert 132 has an outer perimeter substantially commensurate with an inner perimeter of the female contact 130 and a plurality of louvers arranged around an inner perimeter thereof to ensure good electrical contact between the second pin type male contact 40 of the capacitor 22 and the female contact 130.

The contact retainer plate 122 has a hole 134 which is larger than an outer perimeter of the pin type male contact 40 of the capacitor 22 but smaller than an outer perimeter of the female contact insert 132. Accordingly, the female contact insert 132 is retained within the female contact 130 by the contact retainer plate 122.

The insulating material 124 has a void 136, in the form of a recess, concentric with both the void 126 and the void 128. Within the void 136 is a conductor 138. The female contact 130 is electrically attached to the conductor 138 by braising or other suitable means. Accordingly, a potential may be supplied to the pin type male contact 40 of the capacitor 22 by way of the conductor 138 instead of through the housing 90. This arrangement permits both of the pin type male contacts 32 and 40 to be supplied with potentials other than ground potential while at the same time maintaining the housing 90 at ground potential, if desired.

Figure 7:
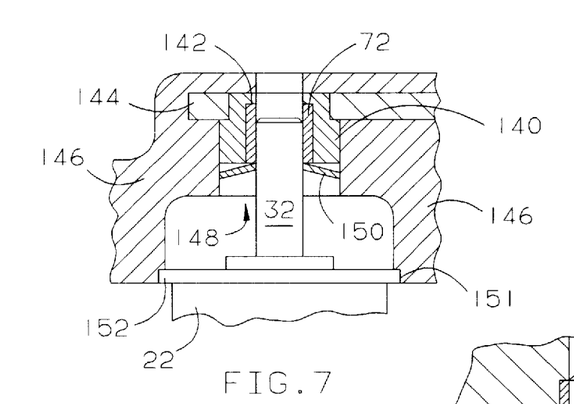
FIG. 7 illustrates a further alternative arrangement for mechanically supporting and electrically connecting the capacitor shown in FIG. 2.

Instead of retaining the female contact inserts as shown in FIGS. 3 and 6, the female contact inserts, such as the female contact insert 72, may be retained as shown in FIG. 7. In FIG. 7, a female contact 140 has a flanged end 142. One end of the female contact insert 72 abuts the flanged end 142 of the female contact 140. The female contact 140 may be an electrically conductive bushing, for example, and may be electrically attached to a conductor 144 as by braising or by any other suitable means. An insulating material 146 surrounds the female contact 140 and the conductor 144 as shown. The insulating material 146 has an opening 148 into which a spring washer 150 is inserted to retain the female contact insert 72 within the female contact 140. The spring washer 150 may be a Belleville washer, for example.

Furthermore, instead of correctly locating the capacitor 22 by the use of the pilots 48 and/or 52 and the pilot plates 80 and/or 94 as shown in FIG. 3, the insulating material 146 has a recessed shoulder 151. The recessed shoulder 151 is arranged to cooperate with a shoulder 152 of the capacitor 22 in order to establish alignment of the capacitor 22 as its pin type male contact 32 is inserted into the female contact insert 72 of the female contact 140 and to maintain that alignment once the pin type male contact 32 is fully inserted into that female contact 140. A further advantage of the arrangement shown in FIG. 7 is that, upon a failure of the capacitor 22, no pilot plate or bus bar is bent or distorted. Thus, only the failed capacitor requires replacement.

Figure 8:
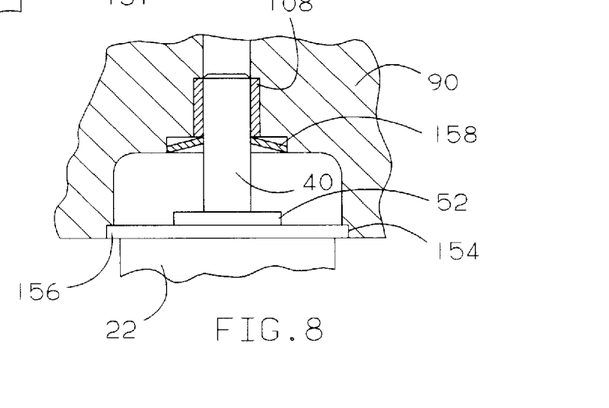
FIG. 8 illustrates a still further alternative arrangement for mechanically supporting and electrically connecting the capacitor shown in FIG. 2.

FIG. 8 shows an arrangement, similar to that shown in FIG. 3, for use in electrically connecting the pin type male contact 40 of the capacitor 22 to the housing 90; however, instead of correctly locating the capacitor 22 by the use of the pilot 52 and the pilot plate 94 as shown in FIG. 3, a locating arrangement similar to FIG. 7 may be used. Specifically, a recessed shoulder 154 is provided in the housing 90. The recessed shoulder 154 is arranged to cooperate with a shoulder 156 of the capacitor 22 in order to establish alignment of the capacitor 22 when its pin type male contact 40 is inserted into the female contact insert 108 and to maintain that alignment once the pin type male contact 40 is fully inserted into that female contact insert 108. A spring washer 158 is provided to retain the female contact insert 108 within the housing 90. The spring washer 158 may be a Belleville washer, for example.

Figure 9:
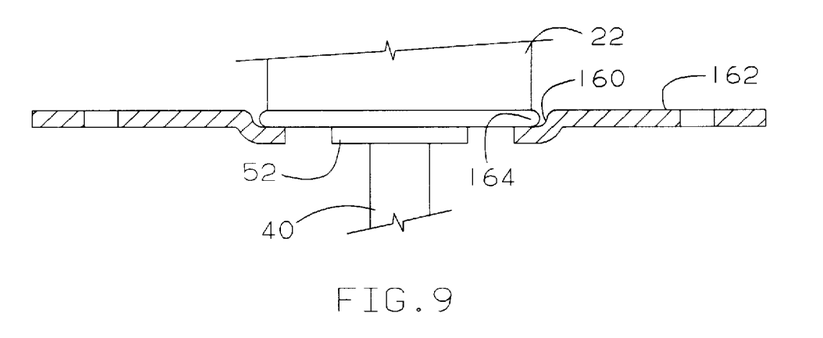
FIG. 9 illustrates another alternative arrangement for mechanically supporting and electrically connecting the capacitor shown in FIG. 2.

Instead of correctly locating the capacitor 22 by the use of the recessed shoulder 151 in the insulating material 146 or the recessed shoulder 154 in the housing 90, as shown in FIGS. 7 and 8, respectively, a shoulder 160 formed in a plate 162 can be used, as shown in FIG. 9. The recessed shoulder 160 is arranged to cooperate with a shoulder 164 of the capacitor 22 in order to establish alignment of the capacitor 22 when its pin type male contact 40 is inserted into a female contact (not shown) and to maintain that alignment once the pin type male contact 40 is fully inserted into that female contact.

Figure 10:
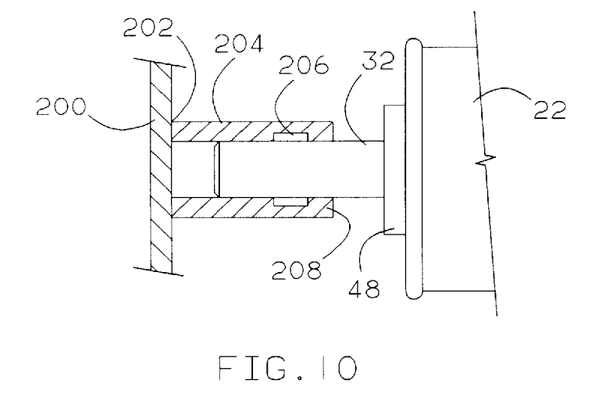
FIG. 10 illustrates an alternative arrangement for electrically connecting the capacitor shown in FIG. 2.

FIG. 10 shows an alternative arrangement for electrically connecting the capacitor 22 to a bus bar 200. Instead of inserting the female contact 66 through a hole in the bus bar 64 and then braising or otherwise attaching the female contact 66 to the bus bar 64 as shown in FIGS. 3 and 7, a female contact may be butt braised or otherwise suitably attached to a solid portion of the bus bar 200. Accordingly, as shown in FIG. 10, an end 202 of a female contact 204 is suitably attached, as by braising, to the bus bar 200. A female contact insert 206, which may be similar to that shown in FIGS. 4 and 5, is pressed into an inner perimeter of the female contact 204. An end 208 of the female contact 204 receives the pin type male contact 32 of the capacitor 22 to establish an electrical connection between the bus bar 200 and the capacitor 22.

Figure 11:
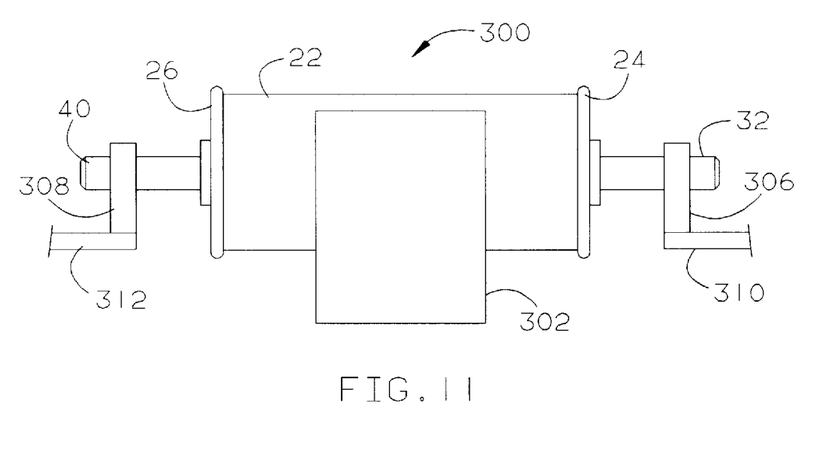
FIGS. 11 through 13 illustrate yet another alternative arrangement for mechanically supporting and electrically connecting the capacitor shown in FIG. 2.
Figure 12:
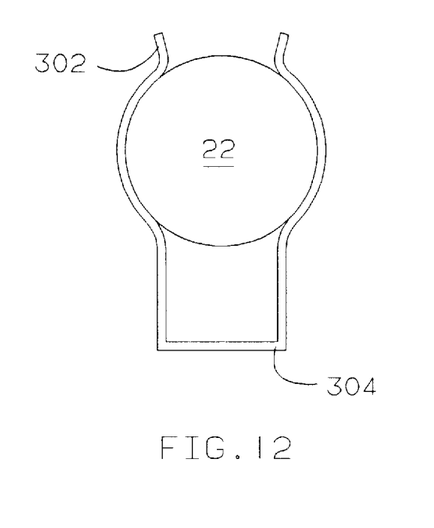
Figure 13:
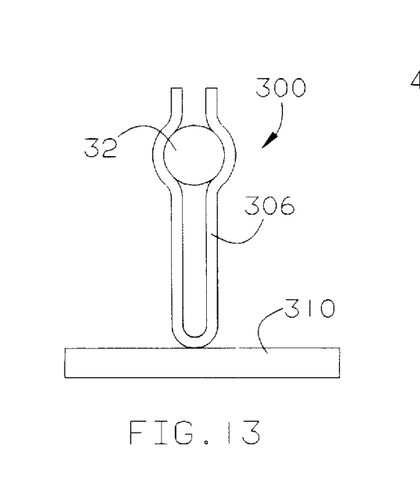

Accordingly, there is shown an arrangement where the pin type male contacts of a capacitor can be plugged into corresponding female contacts to reduce the labor and cost associated with electrically connecting a capacitor. Alternatively, it may be possible to use a clip arrangement 300 as shown in FIGS. 11 through 13 for providing an electrical connection to the pin type male contacts 32 and 40 of the capacitor 22. As shown in FIGS. 11 and 12, i.e. the side view and end view of the clip arrangement 300, respectively, the clip arrangement 300 includes a support clip 302 having a flat portion 304. The support clip 302 may be attached to a housing (not shown in FIGS. 11 and 12), as by threading suitable screws through the flat portion 304 of the support clip 302 and into a housing. The support clip 302 is resilient to receive and to mechanically hold the capacitor 22 to the housing.

The clip arrangement 300 also includes a pair of female contacts 306 and 308, in the form of contact clips, each of which is attached, such as by braising, to corresponding bus bars 310 and 312. The female contacts 306 and 308, such as the female contact 306 as shown in FIG. 13, receive their corresponding pin type male contacts 32 and 40 of the capacitor 22. Accordingly, the support clip 302 of the clip arrangement 300 supports the capacitor 22 to a housing, and the clips 306 and 308 electrically connect the pin type male contacts 32 and 40 of the capacitor 22 to the corresponding bus bars 310 and 312. Upon failure of the capacitor 22, the clips 306 and 308 permit axial movement of the pin type male contacts 32 and 40 without bending or distorting the bus bars 310 and 312.

Figure 14:
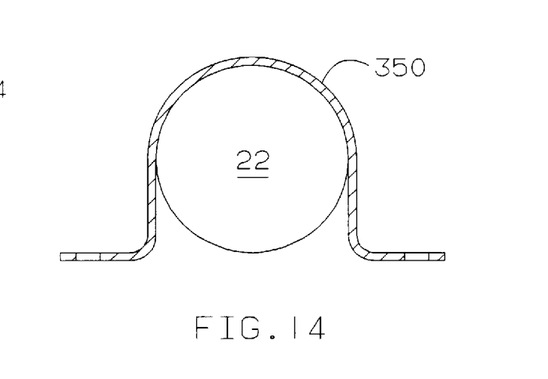
FIG. 14 illustrate an alternative arrangement for mechanically clamping the capacitor shown in FIGS. 11 through 13; and, FIG. 15 illustrates in greater detail a pilot plate for use in connection with the arrangement shown in FIG. 3.

Instead of clamping the capacitor 22 to a support structure as shown in FIGS. 11–13, a straplike clamp 350 can be used as shown in FIG. 14. As shown, the clamp 350 encircles a portion of the capacitor 22 and may be fastened at its ends to a support structure in order to clamp the capacitor 22 to the support structure. The pin type male contacts 32 and 40 may be electrically connected as shown in FIG. 11.

Figure 15:
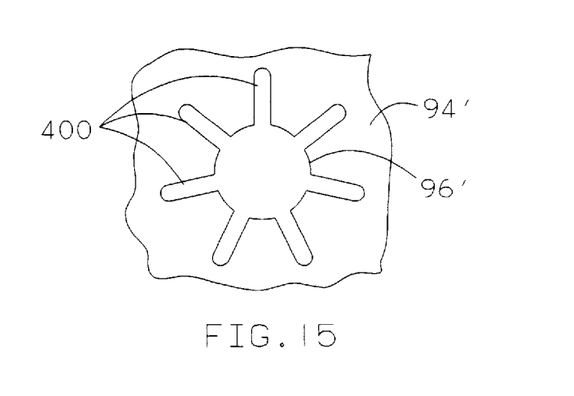

Also, the pilot plates 80 and/or 94 may be arranged according to FIG. 15. In FIG. 15, a pilot plate 94' having a pilot hole 96' can be arranged with slots 400 radiating from the hole 96'. The pilot hole 96' is, therefore, a soft hole which absorbs axial forces from the capacitor 22 along its longitudinal axis 30. For example, when film capacitors fail, they tend to expand axially. If the axial movement along the longitudinal axis 30 of the capacitor 22 is not absorbed, the capacitor 22 may instead explode radially. A radial explosion may be much more severe than an axial expansion, and can cause a great deal of damage to adjacent hardware. Accordingly, the pilot plate 94' has the soft hole 96' to absorb the axial forces along the longitudinal axis 30 of the capacitor 22 which may result from a failure of the capacitor 22.

Some modifications of the present invention have been described above. Other modifications will be apparent to those skilled in the art and are within the scope of the present invention. Accordingly, the scope of the present invention is to be limited only by the claims.

I claim:

1. An electrical apparatus, comprising:

an electrical component including a plurality of projections therefrom, the projections providing electrical connections for the electrical component; and a supporting means including a plurality of apertured means for receiving the plurality of projections and establishing the electrical connections therewith, the plurality of apertured means being arranged to accommodate movement of the plurality of projections during utilization of the electrical component without discontinuity of the electrical connections;

wherein the supporting means includes a stabilizing means for maintaining the plurality of apertured means in predetermined spacial relationships relative to one other during movement of the electrical component; and wherein the electrical component includes a capacitor having first and second pin contacts, wherein the supporting means includes first pin receiving means for receiving the first pin contact of the capacitor and for establishing an electrical connection between the first pin contact and the first pin receiving means and second pin receiving means for receiving the second pin contact of the capacitor and for establishing an electrical connection between the second pin contact and the second pin receiving means, and wherein the first and second pin receiving means are in corresponding first and second planes which are displaced with respect to one another.

2. The electrical apparatus of claim 1 wherein the first pin receiving means comprises an electrical conductor having a pin receiving hole for receiving the first pin contact.

3. The electrical apparatus of claim 2 wherein the pin receiving hole has a larger perimeter than a perimeter of the first pin contact, and wherein the first pin receiving means further comprises an electrical contact insert within the pin receiving hole, the electrical contact insert being arranged to ensure good electrical contact between the first pin contact and the electrical conductor.

4. The electrical apparatus of claim 3 wherein the supporting means comprises an electrical contact insert retaining means for retaining the electrical contact insert within the pin receiving hole.

5. The electrical apparatus of claim 4 wherein the electrical contact insert retaining means comprises a plate having a retaining hole, the retaining hole having a smaller perimeter than an outer perimeter of the electrical contact insert.

6. The electrical apparatus of claim 4 wherein the electrical contact insert retaining means comprises a spring washer.

7. The electrical apparatus of claim 4 wherein the supporting means comprises a locating means for locating the position of the capacitor.

8. The electrical apparatus of claim 7 wherein the locating means comprises a pilot plate having a pilot hole and wherein the capacitor has a pilot inserted into the pilot hole.

9. The electrical apparatus of claim 8 wherein the pilot plate has slots radially arranged around the pilot hole for absorbing linear forces exerted thereon by the capacitor.

10. The electrical apparatus of claim 7 wherein the locating means comprises a support having a recessed shoulder for receiving a corresponding shoulder of the capacitor.

11. The electrical apparatus of claim 7 wherein the electrical contact insert retaining means comprises a plate having a retaining hole, the retaining hole having a smaller perimeter than an outer perimeter of the electrical contact insert.

12. The electrical apparatus of claim 7 wherein the electrical contact insert retaining means comprises a spring washer.

13. The electrical apparatus of claim 7 wherein the supporting means comprises means for allowing axial movement of the capacitor.

14. The electrical apparatus of claim 13 wherein the means for allowing axial movement of the capacitor comprises voids at ends of the capacitor.

15. The electrical apparatus of claim 3 wherein the electrical contact insert has flexible louvers which flex as the first pin contact is inserted into the first pin receiving means in order to ensure good electrical contact between the first pin contact and the electrical conductor.

16. The electrical apparatus of claim 1 wherein the supporting means comprises a locating means for locating the position of the capacitor.

17. The electrical apparatus of claim 16 wherein the locating means comprises a pilot plate having a pilot hole and wherein the capacitor has a pilot inserted into the pilot hole.

18. The electrical apparatus of claim 17 wherein the pilot plate has slots radially arranged around the pilot hole for absorbing linear forces exerted thereon by the capacitor.

19. The electrical apparatus of claim 16 wherein the locating means comprises a support having a recessed shoulder for receiving a corresponding shoulder of the capacitor.

20. The electrical apparatus of claim 1 wherein the supporting means comprises means for allowing axial movement of the capacitor.

21. The electrical apparatus of claim 20 wherein the means for allowing axial movement of the capacitor comprises voids at ends of the capacitor.

22. An electrical apparatus comprising:
a support including first and second female electrical contacts, the first female electrical contact including a first electrical conductor having a first aperture, the first female electrical contact further including an electrical contact insert within the first aperture, the electrical contact insert having an outer perimeter which is substantially commensurate with the inner perimeter of the first aperture, the support further including an insert retainer arranged to retain the electrical contact insert within the first aperture, the insert retainer including a plate having a retaining hole, the retaining hole having a smaller perimeter than an outer perimeter of the electrical contact insert; and
a capacitor including (i) first and second ends, (ii) an electrode region having an axis intersecting the first and second ends, (iii) an elongated and substantially straight first male electrical contact at, and substantially perpendicular to, the first end of the capacitor, the first aperture of the first electrical conductor having an inner perimeter larger than an outer perimeter of the first male electrical contact and (iv) an elongated and substantially straight second male electrical contact at, and substantially perpendicular to, the second end of the capacitor, wherein the first male electrical contact is inserted into the first female electrical contact for establishing an electrical connection to the first female contact and the electrical contact insert is arranged to ensure good electrical contact between the first male electrical contact and the first electrical conductor, and wherein the second male electrical contact is inserted into the second female electrical contact for establishing an electrical connection to the second female electrical contact.

23. An electrical apparatus comprising:
a support including first and second female electrical contacts, the first female electrical contact including a first electrical conductor having a first aperture, the first female electrical contact further including an electrical contact insert within the first aperture, the electrical contact insert having an outer perimeter which is substantially commensurate with the inner perimeter of the first aperture, the support further including an insert retainer arranged to retain the electrical contact insert within the first aperture, the support further including a pilot plate having a pilot hole; and
a capacitor having a pilot inserted into the pilot hole, the pilot plate having slots radially arranged around the pilot hole for absorbing linear forces exerted thereon by the capacitor, the capacitor including (i) first and second ends, (ii) an electrode region having an axis intersecting the first and second ends, (iii) an elongated and substantially straight first male electrical contact at, and substantially perpendicular to, the first end of the capacitor, the first aperture of the first electrical conductor having an inner perimeter larger than an outer perimeter of the first male electrical contact and (iv) an elongated and substantially straight second male electrical contact at, and substantially perpendicular to, the second end of the capacitor, wherein the first male electrical contact is inserted into the first female electrical contact for establishing an electrical connection to the first female contact and the electrical contact insert is arranged to ensure good electrical contact between the first male electrical contact and the first electrical conductor, and wherein the second male electrical contact is inserted into the second female electrical contact for establishing an electrical connection to the second female electrical contact.

24. The electrical apparatus of claim 23 wherein the insert retainer comprises a plate having a retaining hole, the retaining hole having a smaller perimeter than an outer perimeter of the electrical contact insert.

25. An electrical apparatus comprising:
a support including first and second female electrical contacts, the first female electrical contact including a first electrical conductor having a first aperture, the first female electrical contact further including an electrical contact insert within the first aperture, the electrical contact insert having flexible louvers and an outer perimeter which is substantially commensurate with the inner perimeter of the first aperture, the support further including an insert retainer arranged to retain the electrical contact insert within the first aperture, the insert retainer including a plate having a retaining hole, the retaining hole having a smaller perimeter than an outer perimeter of the electrical contact insert; and
a capacitor including (i) first and second ends, (ii) an electrode region having an axis intersecting the first and second ends, (iii) an elongated and substantially straight first male electrical contact at, and substantially perpendicular to, the first end of the capacitor, the first aperture of the first electrical conductor having an inner perimeter larger than an outer perimeter of the first male electrical contact and (iv) an elongated and substantially straight second male electrical contact at, and substantially perpendicular to, the second end of the capacitor, wherein the flexible louvers of the electrical contact insert flex as the first male electrical contact is inserted into the first female electrical contact for establishing and ensuring an electrical connection between the first male electrical contact and the first electrical conductor of the first female electrical insert, and wherein the second male electrical contact is inserted into the second female electrical contact for establishing an electrical connection to the second female electrical contact.

26. An electrical apparatus comprising:
a support including first and second female electrical contacts, the first female electrical contact including a first electrical conductor having a first aperture, the first female electrical contact further including an electrical contact insert within the first aperture, the electrical contact insert having flexible louvers and an outer perimeter which is substantially commensurate with the inner perimeter of the first aperture, the support further including an insert retainer arranged to retain the electrical contact insert within the first aperture, the insert retainer including a spring washer; and
a capacitor including (i) first and second ends, (ii) an electrode region having an axis intersecting the first and second ends, (iii) an elongated and substantially straight first male electrical contact at, and substantially perpendicular to, the first end of the capacitor, the first aperture of the first electrical conductor having an inner perimeter larger than an outer perimeter of the first male electrical contact and (iv) an elongated and substantially straight second male electrical contact at, and substantially perpendicular to, the second end of the capacitor, wherein the flexible louvers of the electrical contact insert flex as the first male electrical contact is inserted into the first female electrical contact for establishing and ensuring an electrical connection between the first male electrical contact and the first electrical conductor of the first female electrical insert, and wherein the second male electrical contact is inserted into the second female electrical contact for establishing an electrical connection to the second female electrical contact.

27. An electrical apparatus comprising:

a support including first and second female electrical contacts and a locator, the locator including a pilot plate having a pilot hole; and a capacitor having a pilot inserted into the pilot hole, wherein the locator is arranged to locate the position of the capacitor, the capacitor including (i) first and second ends, (ii) an electrode region having an axis intersecting the first and second ends, (iii) an elongated and substantially straight first male electrical contact at, and substantially perpendicular to, the first end of the capacitor, and (iv) an elongated and substantially straight second male electrical contact at, and substantially perpendicular to, the second end of the capacitor, wherein the first male electrical contact is inserted into the first female electrical contact for establishing an electrical connection to the first female contact, and wherein the second male electrical contact is inserted into the second female electrical contact for establishing an electrical connection to the second female electrical contact.

28. The electrical apparatus of claim 27 wherein the pilot plate has slots radially arranged around the pilot hole for absorbing linear forces exerted thereon by the capacitor.

29. An electrical apparatus comprising:

a support including first and second female electrical contacts and a locator having a recessed shoulder; and a capacitor including (i) first and second ends, (ii) an electrode region having an axis intersecting the first and second ends, (iii) an elongated and substantially straight first male electrical contact at, and substantially perpendicular to, the first end of the capacitor, and (iv) an elongated and substantially straight second male electrical contact at, and substantially perpendicular to, the second end of the capacitor, wherein the first male electrical contact is inserted into the first female electrical contact for establishing an electrical connection to the first female contact, wherein the second male electrical contact is inserted into the second female electrical contact for establishing an electrical connection to the second female electrical contact, and wherein the locator is arranged to locate the position of the capacitor and the recessed shoulder of the locator receives a corresponding shoulder of the capacitor.

30. An electrical apparatus comprising:

a support including first and second female electrical contacts; and a capacitor, wherein the support includes means for allowing expansive movement of the capacitor, the capacitor including (i) first and second ends, (ii) an electrode region having an axis intersecting the first and second ends, (iii) an elongated and substantially straight first male electrical contact at, and substantially perpendicular to, the first end of the capacitor, and (iv) an elongated and substantially straight second male electrical contact at, and substantially perpendicular to, the second end of the capacitor, wherein the first male electrical contact is inserted into the first female electrical contact for establishing an electrical connection to the first female contact, wherein the second male electrical contact is inserted into the second female electrical contact for establishing an electrical connection to the second female electrical contact.

31. The electrical apparatus of claim 30 wherein the means for allowing axial movement of the capacitor comprises voids at ends of the capacitor, the voids being arranged to allow axial movement of the first and second male electrical contacts.

32. The electrical apparatus of claim 30 wherein the means for allowing axial movement of the capacitor comprises voids in the first and second female contacts, the voids in the first and second female contacts being arranged to allow axial movement of the first and second male electrical contacts.

33. The electrical apparatus of claim 30 wherein the means for allowing axial movement of the capacitor comprises voids at ends of the capacitor, the voids being arranged to allow axial movement of the first and second ends of the capacitor.

34. The electrical apparatus of claim 33 wherein the means for allowing axial movement of the capacitor comprises further voids at ends of the capacitor, the further voids being arranged to allow axial movement of the first and second male electrical contacts.

35. The electrical apparatus of claim 33 wherein the means for allowing axial movement of the capacitor comprises further voids at the ends of the capacitor, wherein the further voids are in the first and second female contacts, and wherein the further voids in the first and second female contacts are arranged to allow axial movement of the first and second male electrical contacts.

36. A capacitor support structure for use with a capacitor having first and second ends, and an electrode region linearly arranged between the first and second ends, the electrode region having a longitudinal axis extending through the first and second ends of the capacitor, the capacitor further including an electrical pin contact at the first end of the capacitor, the electrical pin contact having first and second ends and a longitudinal axis extending through the first and second ends of the electrical pin contact, the longitudinal axis of the electrical pin contact being parallel to the longitudinal axis of the electrode region, the capacitor support structure comprising:

a female electrical contact for receiving the electrical pin contact, the female electrical contact including an electrical conductor having an aperture, the aperture having an inner perimeter which is larger than an outer perimeter of the electrical pin contact, the female electrical contact including an electrical contact insert within the aperture, the electrical contact insert having an outer perimeter which is substantially commensurate with the inner perimeter of the aperture and having at least two flexible louvers in electrical contact with the electrical pin contact such that the electrical contact insert establishes an electrical connection between the electrical pin contact and the electrical conductor.

* * * * *